United States Patent
Elshafei

(10) Patent No.: US 10,046,991 B2
(45) Date of Patent: *Aug. 14, 2018

(54) HYDROMAGNETIC DESALINATION CELL WITH RARE EARTH MAGNETS

(71) Applicant: KING FAHD UNIVERSITY OF PETROLEUM AND MINERALS, Dhahran (SA)

(72) Inventor: Moustafa Elshafei, Kitchener (CA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 15/708,645

(22) Filed: Sep. 19, 2017

(65) Prior Publication Data

US 2018/0002202 A1 Jan. 4, 2018

Related U.S. Application Data

(63) Continuation of application No. 15/609,070, filed on May 31, 2017, now Pat. No. 9,809,472, which is a (Continued)

(51) Int. Cl.
*C02F 1/46* (2006.01)
*C02F 1/48* (2006.01)
(Continued)

(52) U.S. Cl.
CPC .............. *C02F 1/481* (2013.01); *C02F 1/484* (2013.01); *C25B 1/04* (2013.01); *C25B 1/34* (2013.01);
(Continued)

(58) Field of Classification Search
None
See application file for complete search history.

(56) References Cited

U.S. PATENT DOCUMENTS 3,719,583 A 3/1973 Ustick
4,146,479 A 3/1979 Brown
(Continued)

FOREIGN PATENT DOCUMENTS

WO WO 2011/132477 A1 10/2011

OTHER PUBLICATIONS

"Magnetic Water Treatment Devices Water Descaling machine with SS316 Housing", Jiangsu YLD Water Processing Equipment Co., Ltd., http://www.water-treatmentequipment.com/sale-3725962-magnatic-water-treatment-devices-water-descaling-machine-with-ss316-housing.html, Model No. YLC-2.5, May 21, 2015, 6 pages.

*Primary Examiner* — Arun S Phasge
(74) *Attorney, Agent, or Firm* — Oblon, McClelland, Maier & Neustadt, L.L.P.

(57) ABSTRACT

A hydromagnetic desalination cell including at least one hollow rectangular flow conduit, a first rectangular magnet and a second rectangular magnet each having a north pole face and a south pole face opposite of each other, wherein the first and second rectangular magnets are disposed along a longitudinal axis and on opposite sides of the rectangular flow conduit, a first opening and a second opening on opposite walls of the rectangular flow conduit extending between the first and second rectangular magnets, and a first and second chamber fluidly connected to the first and second openings. A hydromagnetic desalination system and methods of desalinating brine water with the hydromagnetic desalination system are also disclosed.

8 Claims, 6 Drawing Sheets

Related U.S. Application Data continuation of application No. 14/969,828, filed on Dec. 15, 2015, now Pat. No. 9,701,551.

(51) Int. Cl.
  *C25B 1/34* (2006.01)
  *C25B 1/04* (2006.01)
  *C25B 5/00* (2006.01)
  C02F 101/12 (2006.01)
  C02F 103/08 (2006.01)

(52) U.S. Cl.
  CPC ............ C25B 5/00 (2013.01); *C02F 2101/12* (2013.01); *C02F 2103/08* (2013.01); *C02F 2201/483* (2013.01)

(56) References Cited

U.S. PATENT DOCUMENTS

| | | | |
|---|---|---|---|
| 8,197,684 B2 | 6/2012 | Penas Ballester et al. | |
| 8,956,536 B2 | 2/2015 | Yu et al. | |
| 9,701,551 B2* | 7/2017 | Elshafei | C02F 1/481 |
| 9,809,472 B2* | 11/2017 | Elshafei | C02F 1/481 |
| 2004/0007452 A1 | 1/2004 | Warren | |
| 2008/0280262 A1 | 11/2008 | Washington | |
| 2017/0166461 A1 | 6/2017 | Elshafei | |

* cited by examiner

HYDROMAGNETIC DESALINATION CELL WITH RARE EARTH MAGNETS

CROSS-REFERENCE TO RELATED APPLICATIONS

The present application is a Continuation of Ser. No. 15/609,070, pending, having a filing date of May 31, 2017, which is a Continuation of Ser. No. 14/969,828, now U.S. Pat. No. 9,701,551, having a filing date of Dec. 15, 2015.

BACKGROUND OF THE INVENTION

Technical Field

The present invention relates to a hydromagnetic desalination cell having a rectangular flow conduit, a brine desalination system, and method of desalinating brine water using the desalination cell.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Desalination of sea water is common in the Middle East and the Caribbean, and is growing fast in the USA, North Africa, Spain, Australia and China. It is also used on ships, submarines and islands where freshwater is not readily available. Desalination of ground water is also common in the Middle East, Africa, and Australia. Currently, there are six basic techniques that can be used to separate salt from water; and these include distillation, freeze desalination, reverse osmosis, electrodialysis, ion exchange, and electrostatic deionization. Distillation and freezing involve removing pure water, in the form of water vapor or ice from a salty brine. Reverse osmosis and electrodialysis use membranes to separate dissolved salts and minerals from water, while ion exchange involves an exchange of dissolved mineral ions in the water for other, more desirable dissolved ions as the water passes through chemical "resins." Commercial desalination techniques in use today include: reverse osmosis, which uses pressure to drive water through a membrane leaving the salt behind; thermal methods, which use heat to distill water while recapturing heat from vapor condensation; and electrodialysis, which uses an electrical potential to drive ions through a membrane leaving the water behind.

Although reverse osmosis is the most widely used technology, it has several disadvantages. For example, the water recovery is only between 30 to 60% and the disposal of the brine water is a major evironmental issue. The membranes are expensive and can become clogged by scale and fouling, which requires frequent washing and replacement. Disposal of the membranes is also another environmental issue. Further, reverse osmosis is also very energy demanding.

In electrodialysis, brackish water is pumped at low pressures between flat, parallel, ion-permeable membranes that are assembled in a stack. Membranes that allow cations to pass through them are alternated with anion-permeable membranes. A direct electrical current is established to cross the stack by electrodes positioned at both ends of the stack. This electric current pulls the ions through the membranes and concentrates them between each alternate pair of membranes. Partially desalted water is left between each adjacent set of membrane pairs. Scaling of the membrane to remove accumulated salt is avoided in most electrodialysis units by operationally reversing the direction of the electrical current around the stacks at predetermined intervals.

The use of an electrostatic field produced by two electrically charged surfaces to separate ions has been proposed by MacGregor (U.S. Pat. No. 4,948,514—incorporated herein by reference in its entirety), and has been known since then as capacitive deionization. The main problem with such methods is that positive ions accumulate on the negative surface and negative ions accumulate on the positive surface forming ion layers on the order of a few Angstroms, a phenomenon known as "double layer". This phenomenon creates a reverse voltage that neutralizes the electric filed inside the pipe, preventing further separation of ions. Several techniques were then proposed to overcome this problem, e.g. using ion selective membranes.

Boucier et al. (U.S. Pat. No. 8,460,532—incorporated herein by reference in its entirety) reported a deionization and desalination method using electrostatic ion pumping. Surface charge is applied externally, and is synchronized with oscillatory fluid movements between substantially parallel charged plates. Ions are held in place during fluid movement in one direction (because they are held in the electrical double layer), and released for transport during fluid movement in the opposite direction by removing the applied electric field. In this way the ions, such as salt, are "ratcheted" across the charged surface from the feed side to the concentrate side.

Another desalination and water purification method was proposed by Hoenig et al. (U.S. Pat. No. 8,016,993—incorporated herein by reference in its entirety). Salt water is bubbled, aerated, or sprayed to cause breaking bubbles along the surface of the salt water. An electric field is applied above the surface of the salt water. Fresh water droplets and vapor, released in the process of bubble rupture, are then pulled away from the surface of the salt water by the electrostatic field and collected for consumption.

A method and apparatus for purifying liquids in electric field was disclosed by Wildermuth, G. W. (U.S. Pat. No. 5,128,043—incorporated herein by reference in its entirety). The method establishes laminar flow of the liquid, passing the liquid through an electric field transverse to the direction of flow to induce mobility of particles away from a negative field surface, separating the liquid into zones.

Edinger, W. J. (U.S. Pat. No. 7,229,555—incorporated herein by reference in its entirety) proposed to use an electrostatic field to prevent biofouling of membranes in reverse osmosis desalination systems. The technique reduces the cost of maintenance of reverse osmosis systems.

A desalination device using selective membranes and magnetic fields was proposed by Penas Ballester et al. (U.S. 20110147295 A1—incorporated herein by reference in its entirety. A device was designed to desalinate brackish water which combined action of magnetic fields generated inside the device and ion-selective membranes, thus obtaining two separate water currents, one with a low salt concentration and the other reject current with a high sail concentration. The device comprises an external cylindrical body of magnetized iron (1), an inner body also cylindrical and made of the same material (2) and an intermediate chamber (3) in which are placed a series of ion-selective membranes (6 and 7) arranged radially around the axle common to all of the bodies, and placed alternately such that each negative-ion selective membrane has a positive-ion selective membrane on either side.

Warren et al. (U.S. 2004/0262234—incorporated herein by reference in its entirety) disclosed an apparatus and method for the purification of fluids using magnetic-field desalination that does not use electrodes. However, it uses a rotating magnetic field and ion-selective-membrane batteries.

A method and apparatus for separating ions from a fluid stream was proposed by G. Richard, G (U.S. Pat. No. 6,783,687—incorporated herein by reference in its entirety). A magnetic field and an electrostatic field are established across a processing zone through which the fluid stream flows so that the flow vector of the fluid stream, the flux lines of the magnetic field, and the vector of the electrostatic field are mutually orthogonal. The resulting high and low ion effluents may be further processed. No thermal input is required. No vacuum, reverse osmosis or reduced pressure distillation is involved.

A device for electromagnetic desalination of sea water was proposed by Imris, P. (EP1880980—incorporated herein by reference in its entirety). The device used a combination of electrically generated high frequency magnetic field and electrostatic capacitive deionization in a specially designed conduit to separate salt ions of sea water from the stream of water to obtain a fresh water stream, while the ions are forced by the alternating magnetic and electric field to go through separate discharging conduits.

During the past 20 years there has been an ever-increasing interest in the treatment of fluids flowing in conduits by means of magnetic devices which are externally attached to the conduits transmitting the fluids. However, precipitates generally cause problems in these systems by adhering to the inner walls of the conduits and, even if the precipitates are non-corrosive, will thereby decrease the effective cross-sectional area of the conduits as well as increasing the flow resistance within the conduits.

Attempts to overcome such issues include work by Weisenbarger, G. M. (U.S. Pat. No. 4,995,425—incorporated herein by reference in its entirely). The proposed magnetic fluid conditioner for abating the adherence of precipitates in conduits can be used with a variety of liquids and/or gases which contain unwanted compounds capable of adhering to the inner walls of the fluid transmitting conduits. The magnetic fluid conditioner has means for directing the outwardly radiating magnetic flux toward the fluid conducting conduits to thereby increase the magnetic flux acting on the liquid and/or gas flowing in the conduits.

A magnetic apparatus for preventing deposit formation in flowing fluids is also described by Florescu, V. et al. (U.S. Pat. No. 5,453,188—incorporated herein by reference in its entirety), in which an apparatus and method for preventing and minimizing the formation of deposits of parrafin, asphaltene, and scale on the inside of downhole oil string line and on the surface of flow transmission lines is reported. Deposit minimization is performed by increasing the turbulence of various electrically-charged microscopic particles populating crude oil colloidal suspension, using effects of the Lorentz force acting upon such flowing fluid. A plurality of spaced-apart permanent magnet disc assemblies are disposed perpendicularly to a fluid flow.

Another method and apparatus for magnetically treating a fluid was described by Harcourt, G. A. (U.S. Pat. No. 5,683,586—incorporated herein by reference in its entirety). The fluid is passed along a pipeline having a permanent magnet aligned therewith, and a coil, rounded at each end, is wrapped around both the pipe and the magnet. Magnetic flux is enhanced by providing a diode in each turn of the coil surrounding the magnet and pipe. Optionally, a collector plate may be provided in the coil remote from the pipe.

Another device for magnetic conditioning of fluids was described by Mercier, D. (U.S. Pat. No. 5,837,143—incorporated herein by reference in its entirety), which describes a process and a device for the magnetic treatment of fluid as the fluid moves in successive magnetic fields, including a sheet having adjacent transverse bands each of the same width. Each band is charged with magnets oriented alternatively NS/SN or NNSS/SSNN perpendicularly to the plane of the sheet so that successive transverse bands adjacent to each other present upper polar faces alternately having polarities S, N, S, N . . . S,N or S,S, N,N, S,S, N,N, . . . S,S, N,N.

A desalination device with a rotatable magnet is reported by Macleod, P. (WO/2014/001741—incorporated herein by reference in its entirety). This device includes a N and S polarity at the ends of a rotational axis creating a torroidal magnetic field, a means to rotate the magnet, and at least two adjacent and stacked water conduit, adjacent the magnet each having a water inlet and water outlet at a center of the conduit and a second water outlet around the first water outlet. In use, salt water can be passed into the conduit water inlet with said magnet rotating and positive and negative ions in the water migrating away from the conduit center whereby water can then be extracted from the first water outlet which is ion free, and the remaining salt water being extracted from a second water outlet.

In view of the forgoing, an objective of the present invention is to provide a hydromagnetic desalination cell having a rectangular flow conduit, a brine desalination system incorporating the hydromagnetic desalination cell, and a method of desalinating brine water using the desalination cell.

BRIEF SUMMARY OF THE INVENTION

According to a first aspect, the present disclosure relates to a hydromagnetic desalination cell including i) at least one hollow rectangular flow conduit with a conduit inlet on a first end and a conduit outlet on a second end ii) a first rectangular magnet and a second rectangular magnet each having a north pole face and a south pole face opposite of each other, wherein the first and second rectangular magnets are disposed along a longitudinal axis and on opposite sides of the rectangular flow conduit such that the north pole face of the first rectangular magnet contacts the rectangular flow conduit and the south pole face of the second rectangular magnet contacts the rectangular flow conduit iii) a first opening and a second opening on opposite walls of the rectangular flow conduit extending between the first and second rectangular magnets iv) a first chamber fluidly connected to the first opening of the rectangular flow conduit and v) a second chamber fluidly connected to the second opening of the rectangular flow conduit, wherein the first and second rectangular magnets generate a magnetic field that causes cations to flow from the first opening of the rectangular flow conduit to the first chamber, and anions to flow from the second opening of the rectangular flow conduit to the second chamber.

In one embodiment, a distance between the north pole face of the first rectangular magnet and the south pole face of the second rectangular magnet ranges from 0.01-0.035 m.

In one embodiment, the first and second rectangular magnets are neodymium iron boride or samarium cobalt magnets.

In one embodiment, the hollow rectangular flow conduit has a rectangular cross section with a width dimension that is larger than a height dimension.

In one embodiment, the hollow rectangular flow conduit comprises a non-magnetic, non-conducting material.

In one embodiment, the non-magnetic, non-conducting material is polyvinyl chloride.

In one embodiment, the hydromagnetic desalination cell comprises a plurality of stacked hollow rectangular flow conduits, wherein each hollow rectangular flow conduit is fluidly connected to the first chamber through the first opening and the second chamber through the second opening.

In one embodiment, the thickness of the first and second rectangular magnets are the same, and a distance between each stacked hollow rectangular flow conduit is equal to the thickness of the first and second rectangular magnet.

In one embodiment, the thickness of the first and second rectangular magnet ranges from 1-6 cm.

In one embodiment, the hydromagnetic desalination cell further comprises a third chamber with a brine discharge outlet, wherein the third chamber is located downstream of and is fluidly connected in parallel to the first chamber through a first chamber outlet line and the second chamber through a second chamber outlet line and wherein the cations from the first chamber and the anions from the second chamber combine in the third chamber and are expelled from the brine discharge outlet of the third chamber.

In one embodiment, the hydromagnetic desalination cell further comprises a positive electrode connected to the first chamber and a negative electrode connected to the second chamber.

According to a second aspect, present disclosure relates to a hydromagnetic desalination system, including i) the hydromagnetic desalination cell of the present disclosure, in one or more of its embodiments ii) an inlet tank comprising a first brine water comprising sodium cations, chloride anions, and water that is upstream of and fluidly connected to the conduit inlet through an inlet line, wherein the first brine water is flowed through the hydromagnetic desalination cell to separate the sodium cations into the first chamber through the first opening and the chloride anions into the second chamber through the second opening to produce desalinated water iii) a desalinated water line and iv) a desalinated water reflex line that fluidly connects the conduit outlet to the inlet tank for recycling the desalinated water, wherein the desalinated water line and the desalinated water reflux line are fluidly connected in parallel to and downstream of the conduit outlet, wherein the desalinated water has a concentration of sodium-cations and chloride anions that is less than that of the first brine water.

In one embodiment, the hydromagnetic desalination system further comprises a pump fluidly connected to the inlet tank and the conduit inlet, wherein the pump flows the first brine water from the inlet tank to the conduit inlet.

In one embodiment, the hydromagnetic desalination system further comprises a first flow valve positioned in the desalinated water line downstream of the conduit outlet, and a second flow valve positioned in the desalinated water reflux line downstream of the conduit outlet, wherein the first flow valve and the second flow valve may be adjusted so that the desalinated water is flowed through the desalinated water line and collected, is returned to the inlet tank through the desalinated water reflex line, or both.

According to a third aspect, the present disclosure relates to a hydromagnetic desalination system including i) the hydromagnetic desalination cell of the present disclosure, in one or more of its embodiments ii) an inlet tank comprising a first brine water comprising sodium cations, chloride anions, and water that is upstream of and fluidly connected to the conduit inlet through an inlet line, wherein the first brine water is flowed through the hydromagnetic desalination cell to separate the sodium cations into the first chamber through the first opening and the chloride anions into the second chamber through the second opening to produce desalinated water iii) a desalinated water line iv) a desalinated water reflex line that fluidly connects the conduit outlet to the inlet tank for recycling the desalinated water, wherein the desalinated water line and the desalinated water reflux line are fluidly connected in parallel to and downstream of the conduit outlet v) a third chamber that is located downstream of and is fluidly connected in parallel to the first chamber through a first chamber outlet line and the second chamber through a second chamber outlet line and vi) a brine tank that is downstream of and fluidly connected to the third chamber through a brine discharge line, in one embodiment, the sodium cations from the first chamber flow to the third chamber through the first chamber outlet line and the chloride anions from the second chamber flow to the third chamber through the second chamber outlet line to produce a second brine water that is discharged from the third chamber to the brine tank through the brine discharge line. In one embodiment, the desalinated water has a concentration of sodium cations and chloride anions that is less than that of the first brine water. In one embodiment, the second brine water has a concentration of sodium cations and chloride anions that is greater than that of the first brine water. In one embodiment, the hydromagnetic desalination system further comprises a first flow valve positioned in the desalinated water line downstream of the conduit outlet, and a second flow valve positioned in the desalinated water reflux line downstream of the conduit outlet, wherein the first flow valve and the second flow valve may be adjusted so that the desalinated water is flowed through the desalinated water line and collected, is returned to the inlet tank through the desalinated water reflex line, or both.

According to a fourth aspect the present disclosure relates to a hydromagnetic desalination system including i) the hydromagnetic desalination cell of the present disclosure, in one or more of its embodiments ii) an inlet tank comprising a first brine water comprising sodium cations, chloride anions, and water that is upstream of and fluidly connected to the conduit inlet through an inlet line, wherein the first brine water is flowed through the hydromagnetic desalination cell to separate the sodium cations into the first chamber through the first opening and the chloride anions into the second chamber through the second opening to produce desalinated water iii) a desalinated water line iv) a desalinated water reflex line that fluidly connects the conduit outlet to the inlet tank for recycling the desalinated water, wherein the desalinated water line and the desalinated water reflux line are fluidly connected in parallel to and downstream of the conduit outlet v) a positive electrode connected to the first chamber vi) a negative electrode connected to the second chamber vii) a hydrogen outlet line fluidly connected to and downstream of the first chamber viii) a sodium hydroxide outlet line fluidly connected to and downstream of the first chamber and ix) a chlorine outlet line fluidly connected to and downstream of the second chamber. In one embodiment, the desalinated water has a concentration of sodium cations and chloride anions that is less than that of the first brine water. In one embodiment, the positive electrode is electrically connected to the negative electrode through an external circuit to form hydrogen in the first chamber that flows through the hydrogen outlet line, sodium hydroxide in the first chamber that flows through the sodium hydroxide line, and chlorine in the second chamber that flows through the chlorine outlet line. In one embodiment, the hydromagnetic desalination system further comprises a first flow valve positioned in the desalinated water line downstream of the conduit outlet, and a second flow valve positioned in the desalinated water reflux line downstream of the conduit outlet, wherein the first flow valve and the second flow valve may be adjusted so that the desalinated water is flowed through the desalinated water line and collected, is returned to the inlet tank through the desalinated water reflex line, or both.

According to a fifth aspect, the present disclosure relates to a method of desalinating the first brine water with the hydromagnetic desalination system of the present disclosure, in one or more of its embodiments, the method includes i) flowing the first brine water through the hydromagnetic desalination cell to produce the desalinated water in the desalinated water line and collecting a portion of the desalinated water ii) recycling a portion of the desalinated water to the inlet tank through the desalinated water reflex line iii) combining the sodium cations from the first chamber and the chloride anions from the second chamber in the third chamber to produce a second brine water and iv) discharging the second brine water into the brine tank through the brine discharge line.

According to a sixth aspect, the present disclosure relates to a method of desalinating the first brine water with the hydromagnetic desalination system of the present disclosure, in one or more of its embodiments, the method includes i) flowing the first brine water through the hydromagnetic desalination cell to produce the desalinated water in the desalinated water line and collecting a portion of the desalinated water ii) recycling a portion of the desalinated water to the inlet tank through the desalinated water reflex line iii) connecting the positive electrode to the negative electrode through the external circuit and delivering electricity to the external circuit and iv) electrolyzing the first brine water to form hydrogen and sodium hydroxide in the first chamber, and chlorine in the second chamber, and collecting the hydrogen through the hydrogen outlet line, the sodium hydroxide through the sodium hydroxide outlet line, and the chlorine through the chlorine outlet line.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1A:
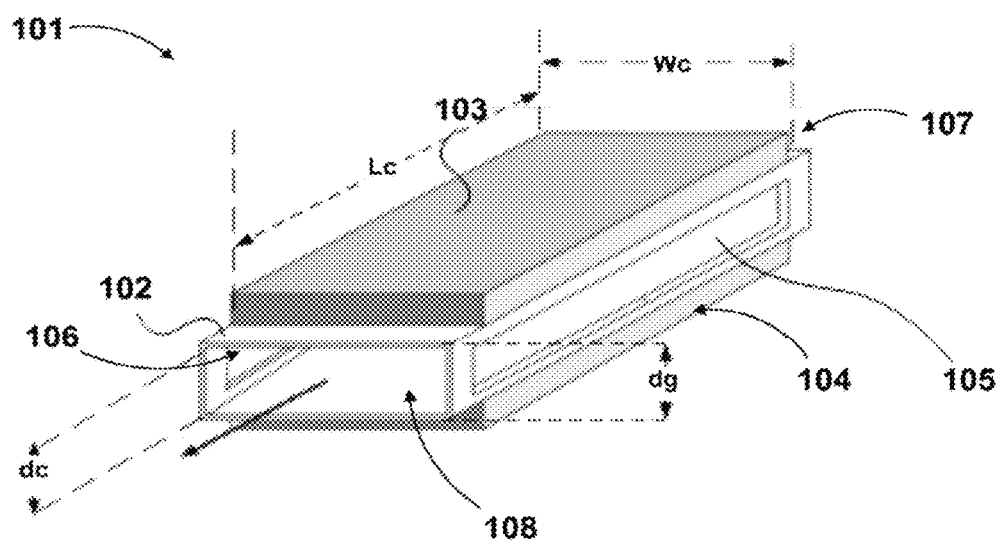
FIG. 1A is an illustration of a hydromagnetic flow conduit cell with a single flow conduit.

Referring now to the drawings, wherein like reference numerals designate identical or corresponding parts throughout the several views.

Figure 1B:
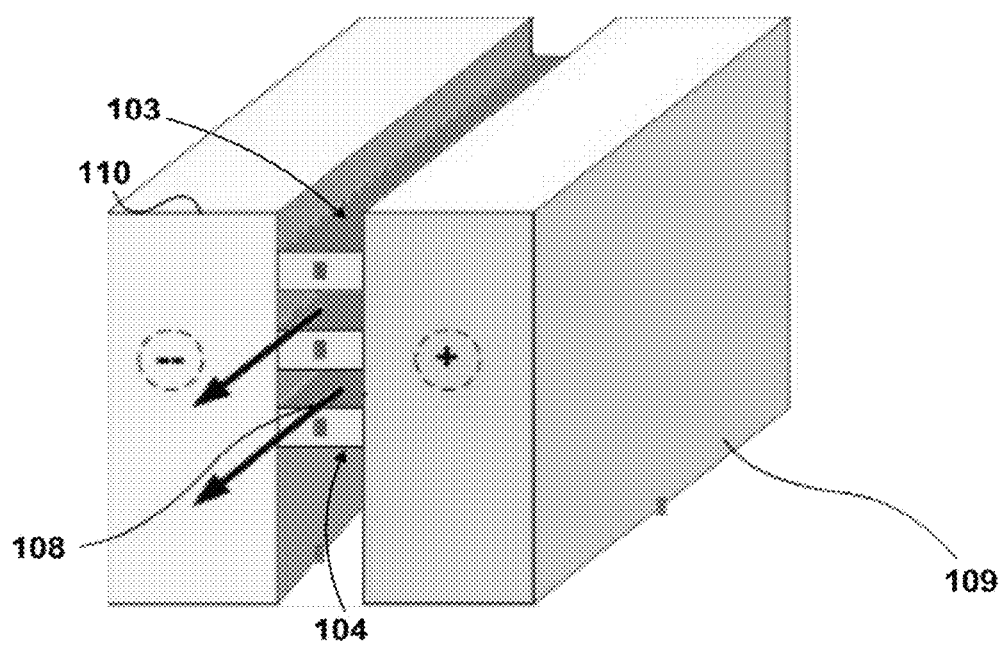
FIG. 1B is an illustration of a hydromagnetic flow conduit cell with stacked flow conduits.

Referring to FIG. 1A and FIG. 1B. According to a first aspect, the present disclosure relates to a hydromagnetic desalination cell 101 including at least one hollow rectangular flow conduit 102 with a conduit inlet 107 on a first end and a conduit outlet 108 on a second end. The hollow rectangular flow conduit has upper and lower walls and opposing side walls that provide a fluid passageway. The upper and lower walls prevent fluid flowing through the conduit from escaping the conduit passageway in a direction towards the upper and/or lower walls. In one embodiment, the hollow rectangular flow conduit has a square cross section. In one embodiment, the hollow rectangular flow conduit has a rectangular cross section with a width dimension ($W_c$) that is larger than a height dimension ($d_c$). The length of the hollow rectangular flow conduit ($L_c$) may be 120-500 cm, preferably 130-480 cm, preferably 140-460 cm, preferably 150-440 cm, preferably 160-420 cm, preferably 170-400 cm. The width of the hollow rectangular flow conduit may be 2-20 cm, preferably 3-16 cm, preferably 4-13 cm, preferably 5-12 cm, preferably 6-11 cm. The height of the hollow rectangular flow conduit may be 0.5-15 cm, preferably 1.0-14 cm, preferably 1.5-13.0 cm, preferably 2.0-11 cm, preferably 2.5-10.0 cm. In one embodiment, the hollow rectangular flow conduit is suitable for non-commercial scale desalination systems (such as personal drinking water purification, lab scale water purification, etc.). In this scenario, the hollow rectangular flow conduit may have a length dimension of 120-180 cm, preferably 130-170 cm, preferably 140-160 cm, a width dimension of 2-5 cm, preferably 2-4.5 cm, preferably 2-4 cm, and a height dimension 0.5-2.0 cm, preferably 1-1.5 cm. In one embodiment, the hollow rectangular flow conduit is suitable for commercial scale desalination systems (such as city water purification, water treatment facilities, etc.). In this scenario, the hollow rectangular flow conduit may have a length dimension of 300-500 cm, preferably 320-470 cm, preferably 340-460 cm, a width dimension of 8-20 cm, preferably 9-16 cm, preferably 10-13 cm, and a height dimension 1.5-15 cm, preferably 2-12 cm. The upper and lower walls and the opposing side walls of the hollow rectangular flow conduit may have varying thickness depending on the type of desalination system employing the desalination cell, for example, the thickness may range from 0.1 cm to 10 cm, or 0.2 cm to 9.5 cm, or 0.3 cm to 9 cm, or 0.4 cm to 8.5 cm, or 0.5 cm to 8 cm, or 0.6 cm to 7.5 cm, or 0.7 cm to 7 cm.

In one embodiment, the hollow rectangular flow conduit comprises a non-magnetic, non-conducting material. Exemplary non-magnetic, non-conducting materials include polymers such as polyether, polyurethane, polyester, polyethylene (i.e. high density, low density, etc.), polyvinylidene chloride, polyvinyl chloride, polystyrene, polyamides, silnylon, acrylonitrile butadiene styrene, polyethylene/Acrylonitrile butadiene styrene, polycarbonate, polycarbonate/acrylonitrile butadiene styrene, and mixtures thereof, ceramics such as glass (e.g. $SiO_2$), porcelain, clay, quartz, alumina, feldspar, or composite polymer materials. In one embodiment, the non-magnetic, non-conducting material is polyvinyl chloride.

Figures 3A, 3B:
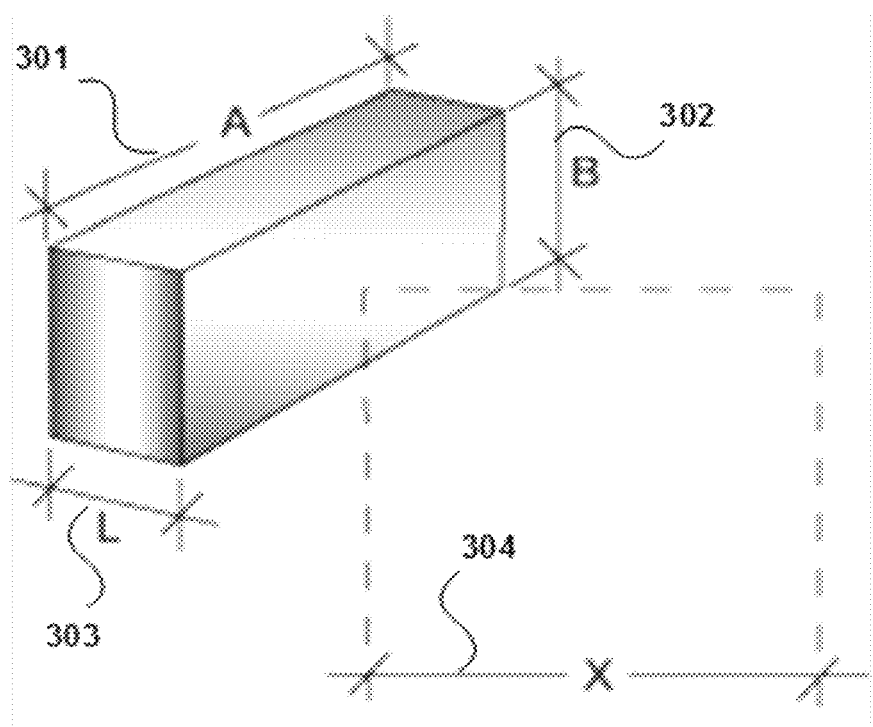
FIG. 3A is an illustration of the dimension of a magnet.
FIG. 3B is an illustration of the magnetic field produced a distance away from the magnet of FIG. 3A.

The hydromagnetic desalination cell 101 also includes a first rectangular magnet 103 and a second rectangular magnet 104 each having a north pole face and a south pole face opposite of each other, wherein the first and second rectangular magnets are disposed along a longitudinal axis and on opposite sides of the rectangular flow conduit (i.e. along the upper and lower walls) such that the north pole face of the first rectangular magnet contacts the rectangular flow conduit and the south pole face of the second rectangular magnet contacts the rectangular flow conduit. By placing magnets having opposite poles oriented toward the longitudinal center of the rectangular flow conduit, a magnetic field is produced that then extends between the magnets. Referring to FIG. 3A, the length 301 of each of the first and second magnets are generally 1 to 40% of the length of the hollow rectangular flow conduit on which they are disposed, or 1 to 35%, or 1 to 30%, or 1 to 25%, or 1 to 20%, or 2 to 15% or 3 to 10%. However, the length 301 of the first and second magnets may fall outside of these length % ranges, and the hydromagnetic desalination may still function as intended. For example the length 301 of each of the first and second magnets may be up to 100% of the length of the hollow rectangular flow conduit on which they are disposed, or up to 90%, or up to 80%, etc. The first and second magnets generally have a similar width dimension 302 to the width of the hollow rectangular flow conduit. The width of the first and second magnet 302 may be at least 60% of the width of the hollow rectangular flow conduit on which they are disposed, of at least 70%, or at least 80%, or at least 90%, or at least 95%, or at least 99%.

In one embodiment, each of the first and second magnets have a thickness 303 ranging from at least 0.5 cm, at least 1 cm, at least 1.5 cm, at least 2 cm, at least 2.5 cm, at least 3 cm, at least 3.5 cm, at least 4 cm, at least 4.5 cm, at least 5 cm, and no more than 10 cm, no more than 9 cm, no more than 8 cm, no more than 7 cm, no more than 6 cm, no more than 5 cm, no more than 4 cm, for example 2-5 cm (FIG. 3A).

Figure 4:
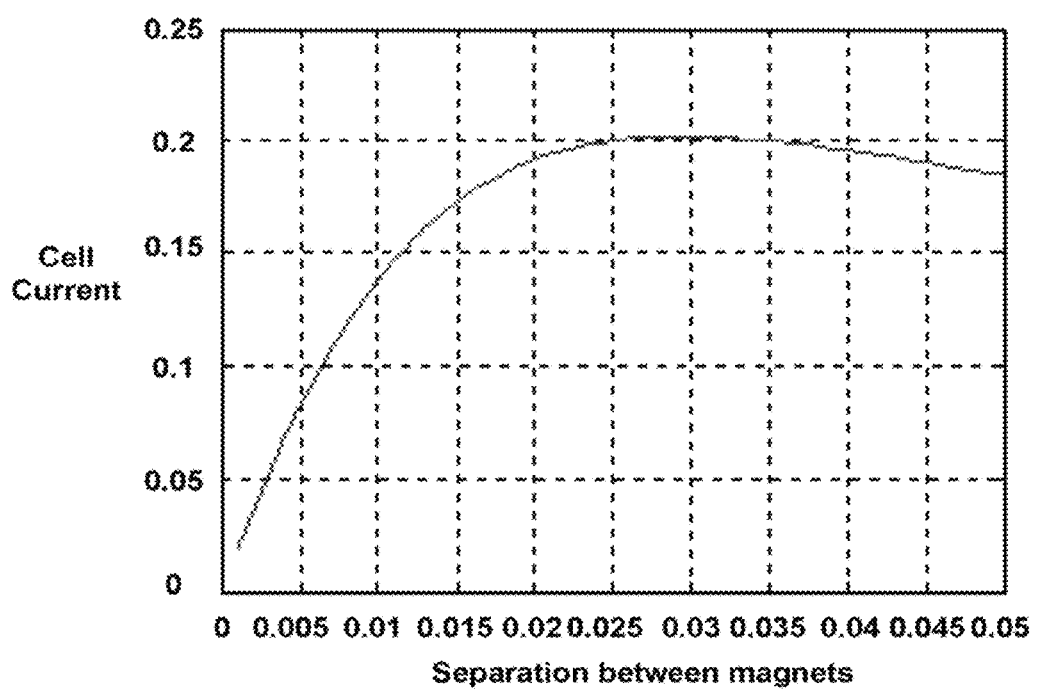
FIG. 4 is a graph illustrating the relationship between the gap (distance) in between the magnets of the desalination cell and the cell current.

As depicted in FIG. 4, the distance between the north pole face of the first rectangular magnet and the south pole face of the second rectangular magnet (see FIG. 1A, $d_g$) may control the strength of the magnetic field extending between the magnets. In one embodiment, a distance between the north pole face of the first rectangular magnet and the south pole face of the second rectangular magnet ranges from 0.5-15 cm, or 0.7-13 cm, or 0.9-11 cm, or 1-10 cm, or 1.2-8 cm, or 1.4-6 cm, or 1.5-5 cm. In a preferred embodiment, when used in non-commercial scale desalination systems (e.g. personal drinking water purification, lab scale water purification, etc.), the distance between the north pole face of the first rectangular magnet and the south pole face of the second rectangular magnet ranges from 1-2 cm. In a preferred embodiment, when used is commercial scale desalination systems (e.g. city water purification, water treatment facilities, etc.), the distance between the north pole face of the first rectangular magnet and the south pole face of the second rectangular magnet ranges from 2-5 cm.

The magnets used for the hydromagnetic desalination cell may be permanent magnets or superconductors rolled in coils around the first and second magnet. The first and second magnets may include iron, nickel, cobalt, rare-earth metals, or alloys thereof, preferably alloys of rare earth metals. In one embodiment, the first and second rectangular magnets are neodymium iron boride or samarium cobalt magnets. At room temperature, neodymium iron boride ($Nd_2Fe_{14}B$) magnets exhibit the strongest magnetic properties of all commercial magnets. Samarium Cobalt $Sm_2Co_{17}^-$ also has high magnetic field strength and inherent stability. In addition to (or in lieu of) neodymium iron boride or samarium cobalt magnets other magnetic materials (e.g. $Sm(Co,Fe,Cu,Zr)_7$, alnico, Sr-ferrite, etc.) may be present in the first and second magnets and the hydromagnetic desalination cell will still function as intended. In one embodiment, the first and second rectangular magnets provide a largest magnetic field strength of 0.2-2 Tesla, preferably 0.8-2 Tesla, preferably 1-1.8 Tesla, preferably 1.2-1.7 Tesla, preferably 1.4-1.6 Tesla. In one embodiment, the magnetic field strength measured in the center of the rectangular flow conduit is 0.3 to 0.6 Tesla, preferably 0.32 to 0.56 Tesla, preferably 0.34 to 0.52 Tesla, preferably 0.36 to 0.48 Tesla, preferably 0.38 to 0.46 Tesla.

The hydromagnetic desalination cell 101 also includes a first opening 105 and a second opening 106 on opposite walls (opposing side walls) of the rectangular flow conduit extending between the first 103 and second rectangular magnets 104. The first and second openings provide a route for ions (anions and cations) to escape the passageway of the rectangular flow conduit as a fluid containing the ions moves along the longitudinal axis and through the flow conduit. Like the rectangular flow conduit, the first and second openings are generally rectangular shaped, although other may also be possible, such as circular, oval, etc. In one embodiment the first and second opening have identical dimensions, with the length of the first and second openings being 50-99% of the length of the rectangular flow conduit, preferably 60-99%, preferably 70-99%, preferably 80-99%, preferably 90-99%. Further, the height of the first and second openings are 50-99% of the height of the rectangular flow conduit, preferably 60-99%, preferably 70-99%, preferably 80-99%, preferably 90-99%. Therefore, of the possible 100% surface area of each side wall, the first and second openings occupy at least 25%, at least 35%, at least 45%, at least 55%, at least 65%, at least 75%, at least 85%, at least 95% of the surface area of each opposing side wall. While the hydromagnetic desalination cell may include a plurality of openings on each opposing side wall, it is preferable for each opposing side wall to contain only one opening that extends along the length and height of the side wall, as described heretofore, for desirable flow properties and separation efficiency.

As seen in FIG. 1B, the hydromagnetic desalination cell also includes a first chamber 109 fluidly connected to the first opening of the rectangular flow conduit 102 and a second chamber 110 fluidly connected to the second opening of the rectangular flow conduit 102. The first and second chambers are integrally attached to the outside surface of the opposing side walls of the rectangular flow conduit such that the first and second chambers fully enclose the first and second openings. Thus, the length and height of the first chamber is generally equal to or greater than the length and height of the first opening 105, and the length and height of the second chamber is generally equal to or greater than the length and height of the second opening 106, such that all fluid (e.g. fluid containing cations and anions) that escapes from the rectangular flow conduit enters into either the first chamber through the first opening 105 or the second chamber through the second opening 106. As used herein, "integrally attached" refers to objects or materials which are intimately joined together such that they are generally not separable by being formed with, molded, fused, sealed, encased, melted, and the like. In one embodiment, the volume ratio of each of the first chamber and the second chamber to the volume of the flow conduit is 1:10 to 1,000:1, 1:1 to 500:1, 10:1 to 400:1, 20:1 to 300:1, 30:1 to 200:1, 40:1 to 100:1, 50:1 to 75:1.

In one embodiment, the first and second rectangular magnets generate a magnetic field that causes any cations present in a feed fluid (e.g. a first brine water) to flow from the first opening 105 of the rectangular flow conduit to the first chamber 109, and any anions present in the feed fluid to flow from the second opening 106 of the rectangular flow conduit to the second chamber 110. When subjected to the magnetic field extending between the magnets, the positively charged, cations and negatively charged anions are deflected laterally away from each other to opposite directions toward the respective first opening or second opening, and are expelled from the conduit through the first or second opening. To prevent external ions from entering (or reentering) the flow conduit through the first or second openings by diffusion or otherwise, fluid adjacent the openings inside and outside (i.e. from the first or second chamber) the flow conduit should maintain parallel flow. An ionized solution, such as seawater, flowing past the first and second openings outside the conduit faster than the partially deionized solution inside the conduit will produce a Venturi suction which draws off some of the desalinated solution having lowered salinity through the openings into the outside flow stream within the first and second chamber. This forms a thin boundary layer of lowered salinity along the first and second openings of the conduit which assists in preventing the external ion intrusion mentioned above.

As depicted in FIG. 1B, in one embodiment, the hydromagnetic desalination cell comprises a plurality of stacked hollow rectangular flow conduits, wherein, each hollow rectangular flow conduit is fluidly connected to the first chamber through the first opening and the second chamber through the second opening. In this scenario, the first and second chamber have a length and height that is much larger than the length and height of the first and second opening of each individual rectangular flow conduit, whereby the first and second chamber fully enclose the first and second opening of all stacked hollow flow conduits. In one embodiment, the hydromagnetic desalination cell having stacked rectangular flow conduits has a top magnet 103 and a bottom magnet 104, with alternating flow conduits and magnets there between. In this setup, two adjacent stacked flow conduits may share a magnet, such that the second magnet to a first flow conduit may also act as the first magnet to a second flow conduit that is located beneath the first flow conduit in a stacked orientation. For example, a hydromagnetic desalination cell with N conduits, requires N+1 permanent magnets. In one embodiment, the hydromagnetic desalination cell may include 2, 3, 4, 5, 6, 7, 8, 9, 10, 11, 12, 13, 14, 15, 16, 17, 18, 19, or 20 rectangular flow conduits, although addition flow conduits may also be possible. In one embodiment, the thickness of the first and second rectangular magnets are the same, and a distance between each stacked hollow rectangular flow conduit is approximately equal to the thickness of the first and second rectangular magnets.

The hydromagnetic desalination cell may also be assembled in series, is parallel and in networks for economic scaling of desalination processes within a production plant, for example.

Figure 2:
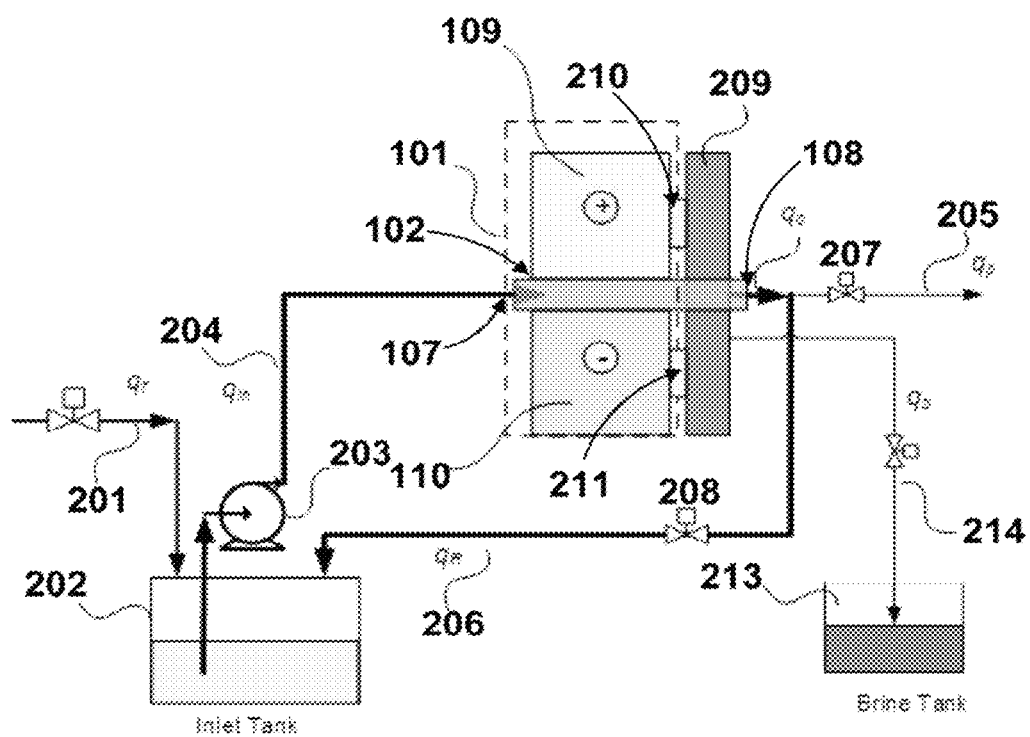
FIG. 2 is an illustration of a hydromagnetic desalination system with the third chamber and a brine tank.

In one embodiment, the hydromagnetic desalination cell further comprises a third chamber 209 with a brine discharge outlet, wherein the third chamber is located downstream of and is fluidly connected in parallel to the first chamber 109 through a first chamber outlet 210 line and the second chamber 110 through a second chamber outlet line 211 and wherein the cations from the first chamber and the anions from the second chamber combine in the third chamber and are expelled from the brine discharge outlet of the third chamber (see FIG. 2). The third chamber provides a mixing and holding container for recombining the sodium cations from the first chamber and the chloride anions from the second chamber and may therefore have different shapes and sizes. For example, the third chamber may be rectangular, cubical, spherical, cylindrical and the like, and may generally have a volume ratio to each of the first chamber and the second chamber in the range of 1:10 to 10:1, or 1:5 to 5:1, or 1:2 to 2:1, or about 1:1.

Figure 5:
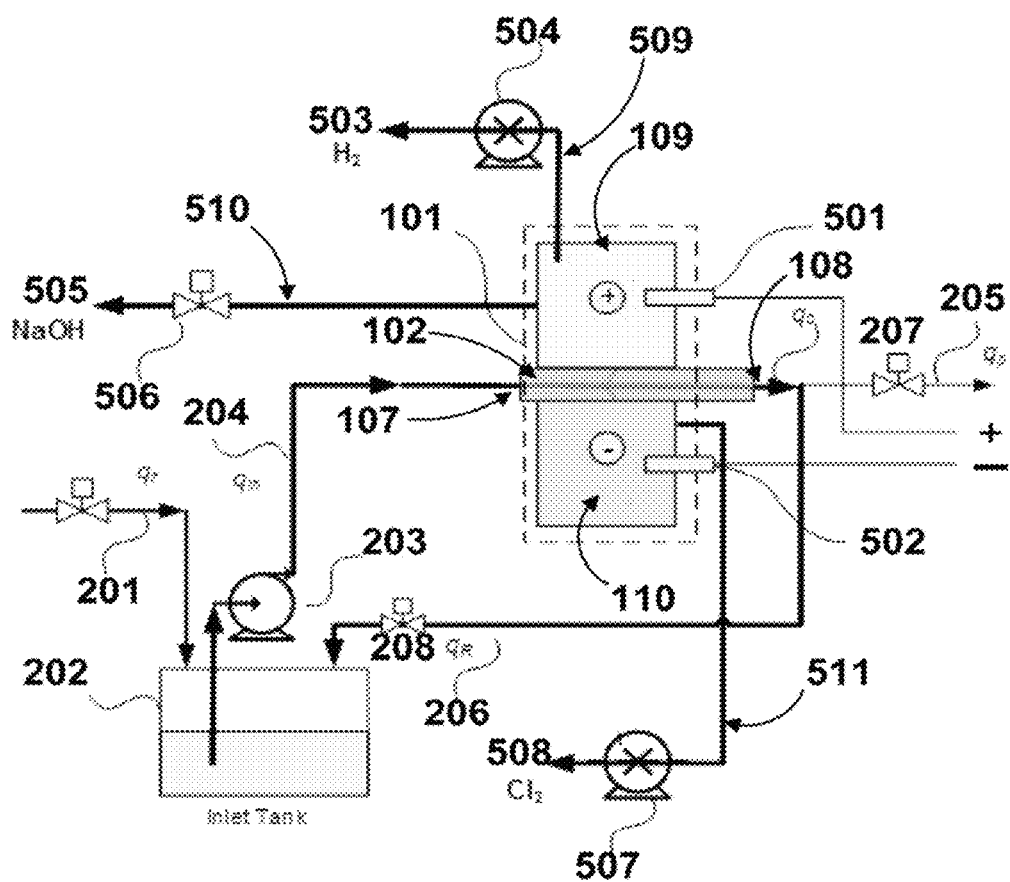
FIG. 5 is an illustration of a hydromagnetic desalination system with a positive and negative electrode for producing hydrogen, chlorine, and sodium hydroxide byproducts in addition to desalinated water.

In one embodiment, the hydromagnetic desalination cell further comprises a positive electrode 501 connected to the first chamber 109 and a negative electrode 502 connected to the second chamber 110 (see FIG. 5).

The hydromagnetic desalination cell may further comprise a cation sequestration material and an anion sequestration, material. The cation sequestration material is a material that effectively binds to cations (e.g. sodium cations), incorporates the cations into pores present within cation sequestration material, or reacts with the cations, thereby removing said cations from the solution. Likewise, the anion sequestration material can incorporate the anions (e.g. chloride anions) into pores present within anion sequestration material, or react with the anions, thereby removing said anions from the solution. When paired together, the cation and anion sequestration material may remove salts (e.g. NaCl) from a brine solution or otherwise reduce the total concentration of the salts in the solution. Therefore, when present in the hydromagnetic desalination cell of the present disclosure, the cation sequestration material and the anion sequestration material may aid in removing or lowering the total concentration of cations and anions in a solution passed through the desalination cell. These materials may be present within the rectangular flow conduit, for example as a lining on an interior surface of the passageway of the flow conduit or as a cross sectional filter within the path of a fluid flowing through the flow conduit or through the conduit inlet line 204. Exemplary cation sequestration materials include crown ethers (e.g. such as 18-crown-6 which has high affinity for potassium cation, 15-crown-5 which has a high affinity for sodium cations, and 12-crown-4 which has a high affinity for lithium cations), amino acids, zeolites, or diatomaceous earth [see Heinbigner et al. U.S. 20070256603A1—incorporated herein by reference in its entirety]. Exemplary anion sequestration material includes compounds or compositions comprising calcium oxide, iron, and aluminum oxide, such as the compound/compositions described in U.S. Pat. No. 7,074,263 B2, which is incorporated herein by reference in its entirety.

Referring now to FIG. 2, according to a second aspect, the present disclosure relates to a hydromagnetic desalination system, including the hydromagnetic desalination cell of the present disclosure 101, in one or more of its embodiments, and an inlet tank 202 comprising a first brine water comprising sodium cations, chloride anions, and water that is upstream of and fluidly connected to the conduit inlet 107 through an inlet line 204.

Desalination is a process that removes some amount of salt and/or other minerals from saline water, brackish water, seawater, brine etc. In general brackish water contains 0.05-3% dissolved salts, saline water and seawater contain 3-5% dissolved salts, and brine contains greater than 5% dissolved salts (as presented herein % refers to % by weight based on the total weight of dissolved solids and total solution weight). In terms of the present disclosure, the term "brine water" is used as a general term for any water than contains more salinity than freshwater (freshwater generally contains less than 0.05% salinity), and may therefore refer to saline water, brackish water, seawater, or brine. Further, the term "desalinated water" refers to any water that has been passed through the desalination system described herein that has a salt concentration that is less than the salt concentration of the feed water prior to desalination (i.e. the first brine water). Salts that are present in brine water that may be removed with the hydromagnetic desalination of the present disclosure may be, but are not limited to, cations such as sodium, magnesium, calcium, potassium, ammonium, and iron, and anions such as chloride, bicarbonate, carbonate, sulfate, sulfite, phosphate, iodide, nitrate, acetate, citrate, fluoride, and nitrite. In a preferred embodiment, the first brine water comprises sodium cation and chloride anions. The "first brine water" as used herein refers to an aqueous solution comprising one or more salts that is to be desalinated. The first brine water may come from a variety of sources, including, but not limited to surface water that collects on the ground or in a stream, an aquifer, a river, a lake, a reservoir, an ocean, ground water that is obtained by drilling wells, run-off, industrial water, public water (city water, well water, etc.), an industrial waste water stream, sewage, water treatment facility water, and bodily fluids (urine, blood, etc.). In one embodiment, the first brine water has a salt (e.g. sodium chloride) concentration of 30,000 to 40,000 ppm, preferably 33,000 to 38,000 ppm, more preferably 34,000 to 36,000 ppm, or about 35,000 ppm (about 3.5% salts by weight).

In one embodiment, the first brine water is flowed through the hydromagnetic desalination cell 101 to separate the sodium cations into the first chamber 109 through the first opening and the chloride anions into the second chamber 110 through the second opening to produce desalinated water. In non-commercial scale desalination systems (e.g. personal drinking water purification, lab scale water purification, etc.) the first brine water may be flowed through hydromagnetic desalination cell ($q_{in}$) with a flow rate of 3.5-5.0 L/min, 4.0-4.8 L/min, 4.4-4.6 L/min. In commercial scale desalination systems (e.g. city water purification, water treatment facilities, etc.) the first brine water may be flowed through hydromagnetic desalination cell with a flow rate of 2.5-3.5 m$^3$/min, 2.7-3.3 m$^3$/min, 2.9-3.0 m$^3$/min. In either scenario, the velocity of the first brine water in the flow conduit is 10 to 17 m/sec, 11 to 16 m/sec, 12 to 15 m/sec.

The inlet tank 202 is a general holding/storage vessel for the first brine water, and may be of various shapes and size so long as the inlet tank is of sufficient size to store a total volume of the first brine water that is to be desalinated. For example, in a non-commercial application of the hydromagnetic desalination system, whereby 2-20 L of the first brine water is to be desalinated, the inlet tank should have a total volume storage capacity of 5 to 25 L. Further, in a commercial scale application of the hydromagnetic desalination system, whereby 20-100 m$^3$ of the first brine water is to be desalinated, the inlet tank should have a total volume storage capacity of 25-150 m$^3$. Various other amounts of first brine water and total volume storage capacity of the inlet tank may also be used in the present hydromagnetic desalination system and the system will still function as intended. The first brine water may be pumped into the inlet tank 202 through an inlet tank feed line 201. The first brine water is preferably pumped out of the inlet tank 202 at a feed rate $q_{in}$ that is the same or higher than the rate at which the first brine water is led into the inlet tank $q_f$ through the inlet tank feed line 201.

The hydromagnetic desalination system includes a desalinated water line 205 which connects the conduit outlet 108 to a collection source (e.g. a collection vessel, a potable water network, etc.). The flow rate ($q_o$ or $q_p$) of the desalinated water through the desalinated water line 205 may be 3.0-4.0 L/min, 3.1-3.5 L/min, 3.1-3.3 L/min for non-commercial scale desalination systems and 1.8-3.0 m$^3$/min, 2.0-2.5 m$^3$/min, 2.0-2.2 m$^3$/min for commercial scale desalination systems.

The hydromagnetic desalination system includes a desalinated water reflex line 206 that fluidly connects the conduit outlet 108 to the inlet tank 202 for recycling the desalinated water, wherein the desalinated water line 205 and the desalinated water reflux line 206 are fluidly connected in parallel to and downstream of the conduit outlet 108. The desalinated water exiting from the hydromagnetic desalination cell has a concentration of sodium cations and chloride anions that is less than that of the first brine water. The concentration of salt (i.e. sodium cations and chloride anions) in the desalinated water may be less than 500 ppm, preferably less than 450 ppm, preferably less than 400 ppm, preferably less than 350 ppm, preferably less than 300 ppm, preferably less than 250 ppm, preferably less than 200 ppm, preferably less than 150 ppm, preferably less than 100 ppm, preferably less than 50 ppm. In one embodiment, the water recovery ratio, i.e. the percent ratio of the desalinated water to the first brine water is at least 70%, at least 75%, at least 80%, at least 85%, at least 90%, at least 95%.

In one embodiment, the hydromagnetic desalination system further comprises a pump 203 fluidly connected to the inlet tank 202 and the conduit inlet 107, wherein the pump 203 transfers the first brine water from the inlet tank to the conduit inlet. The pump used to transfer the first brine water to the conduit inlet and/or to flow the brine water through the hydromagnetic desalination cell is non-limiting, and various types of pumps may be used including a centrifugal pump, a rotatory pump, a positive displacement pump, and the like. The pump may have a wide range of power such as 200 W to 900 kW, or 250 W to 850 kW, or 275 W to 830 kW. Depending on the size of the desalination system and the amount of brine water that is to be desalinated, the pump may provide differing flow rates to match such requirements. In one embodiment, the pump flow rate for a non-commercial scale hydromagnetic desalination system is 200-300 L/min, 210-275 L/min, 215-250 L/min, 220-230 L/min. In one embodiment, the pump flow rate for a commercial scale hydromagnetic desalination system is 25-40 m$^3$/min, 30-38 m$^3$/min, 32-36 m$^3$/min.

In one embodiment, the hydromagnetic desalination system further comprises a first flow valve 207 positioned in the desalinated water line downstream of the conduit outlet, and a second flow valve 208 positioned in the desalinated water reflux line downstream of the conduit outlet, wherein the first flow valve 207 and the second flow valve 208 may be adjusted so that the desalinated water is flowed through the desalinated water line and collected, is returned to the inlet tank through the desalinated water reflex line, or both. The flow rates and the volume of desalinated water flowed through the desalinated water line and the desalinated water reflex line can be adjusted to achieve a desirable reflex ratio. The reflex ratio refers to the volume of desalinated water flowed back to the inlet tank to the volume of desalinated water collected, and therefore the reflex ratio indicates what amount is returned to the inlet tank (i.e. the higher the reflex ratio, the less desalinated water is collected). The reflex ratio may be adjusted to produce a desalinated water with a desired purity (i.e. concentration of sodium cation and chloride anions), where a high reflux ratio results in a higher purity for the resulting desalinated water collected from the desalinated water line. The reflex ratio may therefore be variable depending on the desired final desalinated water purity and may range anywhere from 1:1 to 100:1, or 5:1 to 75:1, or 10:1 to 65:1. For example, a non-commercial scale hydromagnetic desalination system may have use a reflux ratio of 30:1 to 70:1, 35:1 to 60:1, 40:1 to 55:1, 45:1 to 50:1. Former, a commercial scale hydromagnetic desalination system may have use a reflux ratio of 5:1 to 15:1, 6:1 to 14:1, 7:1 to 13:1, 8:1 to 12:1, 9:1 to 11:1.

The hydromagnetic desalination system may also comprise a plurality of sensors for measurement of one or more physical variables such as temperature, flow rate, pH, salinity, pressure, conductivity, concentration. These sensors may be electrically connected to flow control elements such as pumps and valves, and control loop elements and automatic control units (e.g. operating computers) to set and maintain the operating parameters. In this scenario, the automated control units can receive signals from the plurality of sensors in the form of feedback, and adjust the system parameters (e.g. flow, temperature, etc.) until the desired parameters of the various system components or fluid (e.g. the salinity of the produced desalinated, water) are met.

As depicted in FIG. 2, according to a third aspect, in addition to i) the hydromagnetic desalination cell 101 of the present disclosure, in one or more of its embodiments, ii) the inlet tank 202, iii) the desalinated water line 205, and iv) the desalinated water reflex line 206, the hydromagnetic desalination system also includes v) the third chamber 209 that is located downstream of and is fluidly connected in parallel to the first, chamber 109 through a first chamber outlet line 210 and the second chamber 110 through a second chamber outlet line 211 and vi) a brine tank 213 that is downstream of and fluidly connected to the third chamber 209 through a brine discharge line 214.

In one embodiment, the sodium cations from the first chamber flow to the third chamber through the first chamber outlet line and the chloride anions from the second chamber flow to the third chamber through the second chamber outlet line to produce a second brine water that is discharged from the third chamber 209 to the brine tank 213 through the brine discharge line 214. The brine discharge line is preferably attached towards or at the bottom of the third chamber to facilitate flow of the second brine water from the third chamber to the brine tank. The brine discharge line may include a flow control valve to start and stop the flow ($q_b$) of the second brine water to the brine tank. The brine tank is a general holding and/or storage tank for the second brine water, and thus may be any shape or size. The volume of second brine water produced by the hydromagnetic desalination system is small compared to the volume of desalinated water produced or the volume of the first brine water (i.e. the second brine water is more concentrated and thus has less water). Therefore, in one embodiment, the brine tank has a total volume storage capacity that is less than the total volume storage capacity of the inlet tank. The brine tank may have a maximum volume storage capacity that allows the hydromagnetic desalination system to operate for 1-100 hours, 10-50 hours, or 20-30 hours without the need to remove the second brine water from the brine tank to prevent overflow.

In one embodiment, the second brine water has a concentration of sodium cations and chloride anions that is greater than that of the first brine water. The concentration of sail (e.g. sodium cations plus chloride anions) in the second brine water may range from 90,000 to 140,000 ppm, 100,000 to 130,000 ppm, 110,000 to 120,000 ppm, 115,000 to 116,000 ppm, or about 115,500 ppm, for example.

The recombination of the sodium cations and the chloride anions in the third chamber to form the second brine water may also release the ionization energy to produce heat. The heat generated in the third chamber and in the brine tank can be used to increase the temperature of the first brine water in the inlet tank, which may aid the desalination process. For example, the inlet tank may be located inside of the brine tank or the brine tank may in some way jacket the inlet tank, wherein the brine tank acts as a hot water bath and results in the heating of the first brine water held inside the inlet task. In another example, the inlet line may pass through a brine tank conduit in the brine tank such that the first brine water flowing from the inlet tank to the hydromagnetic desalination cell may pass through the brine tank conduit whereby heat from the brine tank is exchanged into the flowing first brine water. In one embodiment, the heat generated from recombining the sodium cations and the chloride anions in the third chamber is used to heat the first brine water and increases the temperature of the first brine water by at least 10 K, at least 11 K, at least 12 K, or at least 13 K, and no more than 25 K, or no more than 20 K.

According to a fourth aspect, in addition to i) the hydromagnetic desalination cell 101 of the present disclosure, in one or more of its embodiments, ii) the inlet tank 202, iii) the desalinated water line 205, and iv) the desalinated water reflex line 206, the hydromagnetic desalination system also includes v) a positive electrode 501 connected to the first chamber 109 vi) a negative electrode 502 connected to the second chamber 110 vii) a hydrogen outlet line 509 fluidly connected to and downstream of the first chamber 109 viii) a sodium hydroxide outlet line 510 fluidly connected to and downstream of the first chamber 109 and ix) a chlorine outlet line 511 fluidly connected to and downstream of the second chamber 110 (FIG. 5).

In one embodiment, fee positive electrode 501 is electrically connected to the negative electrode 502 through an external circuit to form hydrogen 503 in the first chamber that flows through the hydrogen outlet line 509, sodium hydroxide 505 in the first chamber that flows through the sodium hydroxide line 510, and chlorine 508 in the second chamber that flows through the chlorine outlet line 511. The electrical current that flows from the positive electrode towards the negative electrode electrolyzes the brine that results in the formation of the hydrogen 503, chlorine gas 508, and sodium hydroxide 505 in their respective chambers. The hydrogen gas 503 may be removed from the first chamber 109 using a hydrogen pump 504, and the chlorine gas 508 may be removed from the second chamber 110 with a chlorine pump 507. Further, the flow of the sodium hydroxide may be controlled using, for example, a sodium hydroxide flow valve 506. Rather than discharging the second brine water having high brine content into a waste land or returning to ocean waters, the generated electrical current can instead be directed towards the production of such industrial products (hydrogen, chlorine gas, sodium hydroxide, etc.), which have various uses. The external circuit is not meant to be limiting and can be any circuitry that provides an electrical connection between the negative and positive electrode. The external circuit, may therefore comprise various electrical components including resistors, connecting wires, capacitors, lamps, and the like.

In addition to sodium hydroxide, magnesium hydroxide may also be produced by connecting the positive electrode 501 to the negative electrode 502, where the magnesium hydroxide is formed in the first, chamber 109. For example, seawater generally has a total dissolved solids (TDS) content of around 35,000 ppm, which equates to about 1.292 kg of magnesium per m³ of seawater. In the above process any magnesium hydroxide produced may precipitate in the first chamber, and may be separated from other soluble compounds present in the first chamber. Magnesium hydroxide is extensively used in various industries, including the pharmaceutical industry and may also be used as a raw material for production of magnesium metal.

The chlorine gas 508 produced may have an initial temperature of 50-90° C., 60-86° C., 70-84° C., or about 80° C. and may also include moisture. Chlorine gas in this temperature range can over time corrode metal components within a system such as metal piping. Therefore, in a preferred embodiment, the chlorine gas produced is cooled and dried after exiting the second chamber 110. Cooling the chlorine gas may aid to remove moisture from the gas stream and may also improve the efficiency of both any downstream compression or liquefaction processes. While not a requirement, it is generally preferred that the chlorine gas have a final temperature after cooling between 18° C. and 25° C. In one embodiment, the chlorine outlet line 511 may be fluidly connected to a cooling device such as a quench tower, a heat exchanger, a cooling jacket, or an expander to cool the chlorine gas produced with the disclosed system.

In one embodiment, at least a portion of the electrical current generated with the hydromagnetic desalination system may be recovered and recycled internally to power secondary production units or can be retained to a power grid or network.

According to a fifth aspect, the present disclosure relates to a method of desalinating the first brine water with the hydromagnetic desalination system of the present disclosure, in one or more of its embodiments, the method includes flowing the first brine water through the hydromagnetic desalination cell to produce the desalinated water in the desalinated water line and collecting a portion of the desalinated water, recycling a portion of the desalinated water to the inlet tank through the desalinated water reflex line, combining the sodium cations from the first chamber and the chloride anions from the second chamber in the third chamber to produce a second brine water, and discharging the second brine wafer into the brine tank through the brine discharge line.

The heat generated in the third chamber and in fee brine tank can be used to increase the temperature of the first brine water in the inlet tank, which may aid the desalination process. Therefore, the method may also involve heating the first brine water prior to the flowing using the heat generated from recombining the sodium cations and the chloride anions to form the second brine water, the various system components being discussed heretofore. The heating may be performed by using the second brine water as a heat bath to the inlet tank holding the first brine water. The heating may also be performed by passing the first brine water in the inlet line through the brine tank conduit located in the brine tank. In this scenario, the brine tank may be in the form of a heat exchanger, such as a heating jacket that jackets the inlet line.

According to a sixth aspect, the present disclosure relates to a method of desalinating the first brine water with the hydromagnetic desalination system of the present disclosure, in one or more of its embodiments, the method includes flowing the first brine water through the hydromagnetic desalination cell to produce the desalinated water in the desalinated water line and collecting a portion of the desalinated water, recycling a portion of the desalinated water to the inlet tank through the desalinated water reflex line, connecting the positive electrode to the negative electrode through the external circuit and delivering electricity to the external circuit, and electrolyzing the first brine water to form hydrogen and sodium hydroxide in the first chamber, and chlorine in the second chamber, and collecting the hydrogen through the hydrogen outlet line, the sodium hydroxide through the sodium hydroxide outlet line, and the chlorine through the chlorine outlet line. The amounts of byproducts (hydrogen, chlorine gas, sodium hydroxide, etc.) and desalinated water can be adjusted based on market demand and market prices.

In one embodiment, the method further comprises preprocessing the first brine water by returning at least a portion of the sodium hydroxide produced from the electrolyzing back to the inlet tank through the sodium hydroxide outlet line, to precipitate at least some cations (e.g. calcium, magnesium, etc.) present in the first brine water as hydroxide compounds (e.g. calcium hydroxide, magnesium hydroxide, etc.). These hydroxide compounds may then be removed from the preprocessed first brine water to decrease the concentration of at least some cations (calcium, magnesium, etc.) in the first brine water that is to be desalinated.

In one embodiment, the method further comprises post-processing the desalinated water by mixing at least a portion of the chlorine gas produced during the electrolyzing with the desalinated water. The post-processing may be performed to reduce or remove bacteria or other organisms present in the desalinated water.

The examples below are intended to further illustrate the hydromagnetic desalination cell, the hydromagnetic desalination system, and uses thereof, and are not intended to limit the scope of the claims.

Example 1

Magnetic Field Calculation

When a moving point charge (an ion) is subjected to a magnetic field, B, a force f, called Lorentz force, will act on the ion, which is given by the following equation $$F_m = q_e(v \times B) \qquad (1)$$

Where $F_m$ is the force (in Newtons),

B is the magnetic field (in Teslas), $q_e$ is the electric charge of the particle (in coulombs), v is the instantaneous velocity of the particle (in meters per second), × is the vector cross product, The magnetic force causes the positive charges and the negative charges to move on opposite sides. An electric e.m.f. is then created between the positive charge side and the negative charge side. For simplicity, it is assumed that the magnetic field is perpendicular to the charge velocity vector. The potential difference $E_m$ creates an electric field $E_m/L$; where L is the distance between the positive and negative charge charges. The electric field produces another electric force given by q $E_m/L$. At an equilibrium state, the force produced by the electric field balances the magnetic force acting on the point charge, i.e.

$$\frac{E_m}{L} q = qvB$$

The potential difference due to the magnetic field is given by $$E_m = BvL \qquad (2)$$

Example 2

Hydromagnetic Desalination Cell

The basic hydromagnetic desalination cell (HMC) is illustrated in FIG. 1A. The cell includes one or more HMC conduits 102, FIG. 1B. Each conduit consists of a rectangular cross section made from non-magnetic, non-conducting material as PVC, with two permanent magnets, where the top magnet has its north pole facing the pipe, while the bottom magnet has its south pole facing the pipe. The HMC conduit has openings to be connected to the first chamber and the second chamber. The black arrow indicates the direction of flow of the water through the conduit (see FIGS. 1A and 1B). The positive ions will be forced to go to the right side opening and the negative ions will be forced to move towards the left side opening. For an HMC with N conduits, it requires N+1 permanent magnets. The magnets could be rare earth magnets, electrical magnets, or super conductor magnets. Example of rare earth magnets are NdFeB and SmCo. Neodymium iron Boron (general composition $Nd_2Fe_{14}B$, often abbreviated to NdFeB) is the most recent commercial addition to the family of modern magnet materials. At room temperatures, NdFeB magnets exhibit the highest properties of all magnet materials. Samarium Cobalt $Sm_2Co_{17}^-$ has also high magnetic field strength and offers greater inherent stability.

It should be clear that the set up in FIGS. 1A and 1B is given for illustration only, and other orientations, shapes, and configurations are clearly possible within the concept.

Example 3

Hydromagnetic Desalination System with Third Chamber

An illustration diagram of one embodiment is shown in FIG. 2. The flow of salty water (i.e. the first brine water) $q_f$ is first collected in a container 202, where the inlet flow $q_f$ is controlled by a standard level control instrumentation. A pump 203 takes the salty water from the inlet tank at a flow rate $q_{in}$ to a hydromagnetic cell (HMC) 101. The HMC consists of a non-magnetic non-conducting pipe of rectangular cross section, where a magnetic field $B_m$ is established perpendicular to two sides of the cell, while the other two sides contain suitable openings. The magnetic field forces the positive ions to pass through the openings on one side of the HMC and move to zone 109. In the same time the magnetic field forces the negative ions in the HMC to pass through another opening on the opposite side of the HMC and move to zone 110. Accordingly, Zone 109 will be substantially charged with positive ions, while zone 110 will be substantially charged with negative ions, wherein the accumulated positive ions cause zone 109 to stay at a positive electric potential, and the accumulated negative ions in zone 110 to stay at negative potential. In one example for small scale units, the charged water in zone 109 and in zone 110 are recombined in zone 209 and discharged as brine $q_b$ (i.e. second brine water), which is collected in a container 213. The discharge rate $q_b$ can be adjusted to produce the desired water recovery ratio and to adjust the ion concentrations in zone 109 and 110 for economical production of byproducts. The discharge brine $q_b$ is at substantially higher salt concentration (TDS) than the salt concentration in the inlet flow. As such, the flow out $q_o$ of the flow conduit 102 has a substantially less total dissolved salt (TDS) than the inlet flow to the conduit $q_{in}$ (i.e. the first brine water) and wherein a fraction of the produced low salt water, called reflex $q_R$, is recombined with the inlet salty water for controlling the amount of salt in the produced fresh water $q_p$.

The following equations demonstrate the analysis for sodium chloride only as NaCl represents over 85% of the salt contents in the sea water. However, expanding the model to include other salt species will follow the same procedure.

The mass balance equation of the entire system is given by $$q_f = q_b + q_p \qquad (3)$$

Where
$q_f$ is the salty water inlet volume feed rate (m³/sec),
$q_p$ is the permeate (distillate) volume flow rate,
$q_b$ is the brine volume flow rate.
Let RR be the water recovery ratio $$RR = \frac{q_p}{q_f}$$

Similarly, the salt mass balance equation $$x_f q_f = x_b q_b + x_p q_p \qquad (4)$$

Where
$x_f$ is the salty concentration in the water in kg/m³,
$x_p$ is the permeate salt concentration in kg/m³,
$x_b$ is the brine salt concentration in kg/m³.
Equation (4) can be written in terms of RR as $$x_f = x_b(1-RR) + x_p RR \qquad (5)$$

Usually $x_f$ is known from the TDS of the inlet water. It is usually between 35-42 kg/m³ in seas and oceans, and 4-5 kg/m³ in brackish water. If $x_p$ is set to a desired value, then $$x_b = \frac{x_f - x_p RR}{1 - RR} \qquad (6)$$

The mass balance equation for the inlet tank is given by $$\frac{dV_{in}}{dt} = q_f + q_R - q_{in} \qquad (7)$$

Where
$V_{in}$ the volume of the water in the inlet tank,
$q_R$ is the reflex volume flow rate.
Let $\alpha_R$ be the reflux ratio $$\alpha_R = \frac{q_R}{q_f}$$

$q_{in}$ is the volume flow rate to the HMC

The salt concentration equation of the inlet tank is $$\frac{d(V_{in}x_{in})}{dt} = q_f x_f + q_R x_p - q_{in} x_{in} \qquad (8)$$

If $V_{in}$ is regulated by a separate control loop, $V_{in}$ can be considered constant. Then, $$V_{in}\frac{dx_{in}}{dt} = q_f x_f + q_R x_p - q_{in} x_{in} \qquad (9)$$

At steady state $$q_{in} x_{in} = q_f x_f + q_R x_p \qquad (10)$$

Let $V_A$ be the volume of the water in the HMC conduit $$V_A \frac{dx_A}{dt} = q_{in} x_{in} - q_o x_A - KI \qquad (11)$$

Where
$x_A$ is the average concentration in the HMC conduit.
Similarly, the steady state equation becomes $$KI = q_{in} x_{in} - q_o x_p \qquad (12)$$

Where $$K = M_{ws}/F,$$

and $M_{ws}$ is the molecular weight of salt, and F is Faraday's constant and is equal to 96,485 C/mole (Coulombs per mole).

The average concentration in the HMC conduit is given by $$x_A = \frac{q_{in} x_{in} + q_o x_p}{q_{in} + q_o} \qquad (13)$$

Finally, $$q_o = q_R + q_p \qquad (14)$$

$$x_{in} = \frac{q_f x_f + q_R x_p}{q_f + q_R} = \frac{x_f + \alpha_R x_p}{1 + \alpha_R} \qquad (15)$$

The brine concentration potential is then given by the Nernst Equation
For concentration potential:

$$Ec = \frac{RT}{zF} \ln\left(\frac{x_b}{x_A}\right) \qquad (16)$$

R is the universal gas constant and is equal to 8.314 J·K−1·mol−1 (Joules per Kelvin per mole),
T is the temperature in Kelvin (K=° C.+273.15),
z is the valence of fee ionic species, for example, z is +1 for Na+, +1 for K+, +2 for Ca2+, −1 for Cl−, etc. (note that z is unitless),
F is the Faraday's constant and is equal to 96,485 C·mol−1 (Coulombs per mole).

For high recovery ratio $x_A$ can be approximated by $$x_A = \frac{x_{in} q_{in} + x_p q_o}{q_{in} + q_o} \cong 0.5 * (x_{in} + x_p) \qquad (17)$$

Referring to FIG. 2 again, when the chambers 109 and 110 are joined by a third chamber 209, a closed electric circuit is established, where the HMC acts as a voltage source, and the current flows from the positive side of the HMC to chamber 109, passing through the third chamber and returning to chamber 110, back to the negative side of the HMC. Since the cross sectional area of chambers 109, 110, and 209 are substantially larger than the HMC, the resistance of the electric circuit is mainly determined by the electrical resistance of the HMC.

Let Lc, Wc, and dc be the length, width, and height of the HMC conduit, then the resistance of the current loop will be given by $$R_w = \frac{\rho_e d_c}{A_c} \qquad (18)$$

Where $\rho_e$ is the resistivity of the water. The resistivity of the water depends on temperature and concentration. An approximate formula for salty water is given by $$\rho_e = \frac{5}{x_A(1 + \alpha_T(T - 25))} \qquad (19)$$

Where $x_A$ is concentration of salt in kg/m3; and $\alpha$=0.02.2/ C°;

The electric current can then be given by $$I = \frac{E_m - E_C}{R_w} = \frac{B(d) W_c v}{\left(\frac{\rho_e W_c}{L d}\right)} - E_c/R_w = \left(\frac{B(d)}{\rho_e}\right)\left(\frac{L}{W_c}\right) q_{in} - E_c/R_w; \qquad (20)$$

The current is directly related to the rate of retrieval of salt and the larger the current the larger the rate of production of fresh water, and the lower its salt content. However, there are a number of conflicting factors affecting the fresh water production rate. For example $q_{in}$ can be increased by increasing the reflex flow rate $q_R$, but this choice is directly related to power consumption and reduces the efficiency. A second choice intuitive solution is to use higher magnetic field. For permanent magnets, the current technology of rare earth magnets provides about 1.6-1.4 Tesla. The magnetic field at the center of the HMC conduit decreases rapidly by the increase of the separation between the two magnets. On the other hand decreasing the separation can lead to rapid increase in the electric resistance and reduction of the net current. The above set of equations are inter-coupled and highly non-linear, but can be solved iteratively.

Example 4

Power Balance Equations $$\text{Electric ionization power} = P_{wre} = E_{in}I = IBvW_c = \frac{IBvW_c d_c}{d_c} = \frac{IBq_{in}}{d} \quad (21)$$

This power must be derived from the Hydraulic power =  (22)
$$P_{wrh} = q_{in}\Delta P$$

From equations (21) and (22)

$$\Delta P = \frac{IB}{d_c} \quad (23)$$

Accordingly the power to be delivered by the pump is given by $$P_{Total} = (q_{in}\Delta P + 0.5 q_{in}v^2 + q_{in}\Delta P_{fr})/\eta_p \quad (24)$$

Where the first term is hydraulic power transferred to electrical power, the second term is the kinetic energy of the water passing through the HMC, and the third term accounts for the friction losses, finally $\eta_p$ is the efficiency of the pump.

The friction pressure head loss can be estimated using standard pipe friction calculations.

Example 5

Magnetic Field Calculation for Rectangular Magnets

The magnetic field produced by a pair of rectangular permanent magnets can be estimated with the help of FIGS. 3A and 3B and FIG. 4. The magnetic field strength at a distance 304 is given by $$B_x = \left(\frac{2B_r}{\pi}\right)\left[\tan^{-1}\left(\frac{AB}{2X\sqrt{4X^2 + A^2 + B^2}}\right) - \tan^{-1}\left(\frac{AB}{2(X+L)\sqrt{4(X+L)^2 + A^2 + B^2}}\right)\right]$$

Where X=$d_g$/2; half the gap between the magnets

Example a magnet A (301)=5.1 cm, B (302)=2.54 cm; L (303)=1.0; x=0.5 cm; Br=1 Tesla Then the magnetic field at the center of the gap Bx=0.414 Tesla Thick magnets (L) are recommended, for example in the above example if L=5 cm, Bx=0.67 tesla;

Clearly if separation between magnets is decreased the magnetic field increases, causing a higher magnetic voltage and more current (higher salt removal rate). On the other hand if the separation decreases the electrical resistance of HMC increases and the current decreases. As such there is a desired separation between the magnets and it should be calculated to maximize the efficiency of the HMC.

Example 6

Small Unit (Brackish water)
Feed water salt concentration=5000 ppm=5 kg/m³. Temperature=300 K;
Desired fresh water salinity=500 ppm=0.5 kg/m³.
Desired recovery ratio=90%;
Magnets: rare earth magnets, each piece is 5×2.5×2 cm; Br=1 Tesla,
Gap between magnets=0.014 meters.
Magnetic field at the middle of the HMC conduit=0.45 Tesla
The HMO has a single conduit 150×2.5×1.0 cm
System operating parameters:
Velocity of water in the HMC is set to 12 m/sec;
Reflex ratio=6.47; brine salinity=45,500 ppm.
Feed water flow rate 24.01 Liter/min
Fresh water flow rate=21.68 Liter/min.
Pump Row rate 180 Liter/min
Pump power=288 watts It should be noticed also that the recombination of ions in the chamber 209 releases the ionization energy and produce hot brine. The hot brine can be utilized to warm up the inlet water to increase the fresh water production rate. In the above example if the inlet water temperature increase from 300 K to 310 K, the fresh water production increases to 33.93 Liter/min.

Small Unit (Seawater)
Feed water salt concentration=35000 ppm=35 kg/m³. Temperature=300 K;
Desired fresh water salinity=500 ppm=0.5 kg/m³.
Desired recovery ratio=70%;
Magnets: rare earth magnets, each piece is 5×2.5×2 cm; Br=1 Tesla.
Gap between magnets=0.014 meters.
Magnetic field at the middle of the HMC conduit=0.45 Tesla
The HMC has a single conduit 150×2.5×1.0 cm
System operating parameters:
Velocity of water in the HMC is set to 15 m/sec;
Reflex ratio=49.25, brine salinity=115,000 ppm.
Feed water flow rate 4.48 Liter/min
Fresh water flow rate=3.13 Liter/min
Pump flow rate 225 liter/min
Pump power=562.5 watts The use of a HMC with 16 channels will then produce 50.14 Liter/min using a pump of 9 kw.

Example 7

Hydromagnetic Desalination System with Positive and Negative Electrodes

An illustration diagram of a second embodiment is shown in FIG. 5. The flow of salty water (i.e. first brine water) $q_f$ is first collected in a container 202, where the inlet flow $q_f$ is controlled by a standard level control instrumentation. A pump 203 takes the salty water from the inlet tank at a flow rate of $q_{in}$ to a hydromagnetic cell (HMC) 101. The HMC consists of a non-magnetic pipe of rectangular cross section, where a magnetic field $B_m$ is established perpendicular to two sides of the cell, while the other two sides contain suitable openings. The magnetic field forces the positive ions to pass through the openings on one side of the HMC and move to zone 109. At the same time the magnetic field forces the negative ions in the HMC to pass through another opening on the opposite side of the HMC into zone 110. Accordingly, zone 109 will be substantially charged with positive ions, while zone 110 will be substantially charged with negative ions, wherein the accumulated positive ions cause zone 109 to stay at a positive electric potential, and the accumulated negative ions in zone 110 to stay at negative potential.

A positive electrode EP (501) is inserted in zone 109, providing a positive electrical potential, and a negative electrode En (502) is inserted in zone 110, providing a negative electrical potential. The two electrodes can then be connected to external circuit through appropriate electrical cables for recovering the ionic energy in the two zones. The electrical energy can be utilized to derive a secondary smaller water desalination unit, or can be reconnected to the power network. The current flowing out of the positive electrode and returning to the negative electrode will result in the following electrolysis of the brine.

The ion concentration in chambers 109 and 110 are governed by the differential equations:

$$V_B \frac{dx_B}{dt} = KI^+ - x_B q_{bb} + x_A q_{bb}$$

$$V_C \frac{dx_C}{dt} = KI^- - x_C q_{bc} + x_A q_{bc}$$

In zone 109, upon receiving two electrons the water is disassociate into hydrogen and hydroxide ions

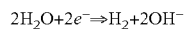
2H$_2$O+2e$^-$⇒H$_2$+2OH$^-$

2OH$^-$+2Na$^+$⇒2NaOH

While in zone 110, the chloride ions lose their electrons to the negative electrode forming Chlorine gas.

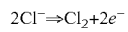
2Cl$^-$⇒Cl$_2$+2e$^-$

As a result, the process produces no brine. Instead it produces hydrogen gas (503) and sodium hydroxide (505) in zone 109, and chlorine gas (508) at zone 110, in addition to the fresh water (i.e. the desalinated water).

Another byproduct is magnesium. Sea water of TDS 33,000 ppm, would typically have 1.292 kg of magnesium/m$^3$ of sea water. In the above process Mg(OH)$_2$ is precipitated in chamber 109, where it can be easily separated. Mg(OH)$_2$ is extensively used in the pharmaceutical industry. The magnesium hydroxide could be used as raw material for production of magnesium metal. A method for manufacture of magnesium hydroxide is described U.S. Pat. No. 3,170,762 A.

Furthermore, a part of the produced NaOH can be fed back to the inlet sea water in a preprocessing stage. When NaOH is added to the raw sea water in a preprocessing stage, calcium hydroxide and magnesium hydroxide will be precipitated, and filtered from the inlet water. This preprocessing step substantially improves the quality of the produced NaOH.

As of 2014, prices per ton of low grade sodium hydroxide was $450 to $550 for textile, oil, pulp and paper; for high grade the price ranges between $700 to $900 per ton for the food industry; and for soap and detergent industry the price ranges between $550 to $650;

Chloride is produced in equal molar quantities as NaOH. Part of the produced chlorine can be used to disinfect the produced fresh water. Chlorine is used in several petrochemical industry, for example to produce polyvinyl chloride (PVC) for PVC pipes; chlorine gas price range between $900-1600 depending on the purity of the final product. The price of hydrogen gas is between $5-12 per Kg. There are two primary uses for hydrogen. About half is used in the Haber process to produce ammonia (NH$_3$), which is then used directly or indirectly as fertilizer. Because both the world population and the intensive agriculture used to support it are growing, ammonia demand is also growing. The other half of current hydrogen production is used to convert heavy petroleum sources into lighter fractions suitable for use as fuels. This latter process is known as hydrocracking. Hydrocracking represents an even larger growth area, since rising oil prices encourage oil companies to extract poorer source material, such as tar sands and oil shale.

Chlorine gas exiting the cell line must be cooled and dried since the exit gas can be over 80° C. and contains moisture that allows chlorine gas to be corrosive to iron piping. Cooling the gas allows for a large amount of moisture from the brine to condense out of the gas stream. Cooling also improves the efficiency of both the compression and the liquefaction stage that follows. The exiting chlorine is ideally between 18° C. and 25° C.

Example 8

Commercial Scale (seawater)
Feed water salt concentration=35000 ppm=35 kg/m$^3$. Temperature=300 K;
Desired fresh water salinity=500 ppm=0.5 kg/m$^3$.
Desired recovery ratio=70%;
Magnets: rare earth magnets, each piece is 20×10×4 cm; Br=1 Tesla,
Gap between magnets=0.03 meters.
Magnetic field at the middle of the HMC conduit=0.391 Tesla
The HMC has a single conduit 400×10×3.0 cm
No of channels=16;
System operating parameters:
Velocity of water in the HMC is set to 12 m/sec;
Reflex ratio=10.89; brine salinity=115,500 ppm.
Feed water flow rate=2.905 m$^3$/min
Fresh water flow rate=2.033 m$^3$/min
Pump flow rate=34.56 m$^3$/min
Pump power=829 Kw
With an average water consumption of 18 litters/day, this unit can feed a city with a population of 160,000.
The rate of production of NaOH can then be calculated as follows
Rate of salt removal=q$_p$ (x$_f$-x$_p$)
NaCl represents 85% by weight of the total salt, then
Rate of NaCl removed=0.85*q$_p$(x$_f$-x$_p$) in kg/sec
Rate of NaCl removal in moles=0.85*q$_p$(x$_f$-x$_p$)*1000/58.44 in moles/sec
Every mole of NaCl produces one mole of NaOH
The rate of production of NaCl=40*0.85*q$_p$(x$_f$-x$_p$)*1000/58.44 gams/sec
This unit will produce 25,916 tons of NaOH/yr.
The rate production of chloride gas, hydrogen, and other species can be calculated similarly.

The invention claimed is:
1. A hydromagnetic desalination cell, comprising:
a plurality of stacked hollow rectangular flow conduits with each conduit having a conduit inlet on a first end and a conduit outlet on a second end, wherein the hollow rectangular flow conduits are made of a non-magnetic and non-conductive material;
a first rectangular magnet and a second rectangular magnet each having a north pole face and a south pole face opposite of each other,
wherein the first rectangular magnet and the second rectangular magnet are independently selected from the group consisting of a neodymium iron boride magnet and a samarium cobalt magnet,
wherein the first and second rectangular magnets are disposed along a longitudinal axis and on opposite sides of the stacked rectangular flow conduits such that the north pole face of the first rectangular magnet contacts a first face of the stacked rectangular flow conduits and the south pole face of the second rectangular magnet contacts a second face of the stacked rectangular flow conduits, and the first and the second rectangular magnets provide a magnetic field that extends between the magnets;

a first opening and a second opening on opposite walls of the stacked rectangular flow conduits extending between the first and second rectangular magnets;

a first chamber fluidly connected to the first opening of the stacked rectangular flow conduits;

a second chamber fluidly connected to the second opening of the stacked rectangular flow conduits;

a positive electrode connected to the first chamber; and a negative electrode connected to the second chamber;

wherein the first and second rectangular magnets generate a magnetic field that causes cations to flow from the first opening of the stacked rectangular flow conduits to the first chamber, and anions to flow from the second opening of the stacked rectangular flow conduits to the second chamber.

2. The hydromagnetic desalination cell of claim 1, wherein a distance between the north pole face of the first rectangular magnet and the south pole face of the second rectangular magnet ranges from 0.01-0.035 m.

3. The hydromagnetic desalination cell of claim 1, wherein the stacked hollow rectangular flow conduits have a rectangular cross section with a width dimension that is larger than a height dimension.

4. The hydromagnetic desalination cell of claim 1, wherein the non-magnetic and non-conducting material is polyvinyl chloride.

5. The hydromagnetic desalination cell of claim 1, wherein the thickness of the first and second rectangular magnets are the same, and a distance between each stacked hollow rectangular flow conduit is equal to the thickness of the first and second rectangular magnet.

6. The hydromagnetic desalination cell of claim 5, wherein the thickness of the first and second rectangular magnet ranges from 1-6 cm.

7. The hydromagnetic desalination cell of claim 1, wherein the first and second rectangular magnets provide a magnetic field strength of 0.3 to 0.6 Tesla in the center of the rectangular flow.

8. The hydromagnetic desalination cell of claim 1, wherein the first and second rectangular magnets provide a magnetic field strength of 0.34 to 0.46 Tesla in the center of the rectangular flow.

* * * * *